(No Model.)
J. H. ROGERS.
TELEPHONE.
No. 252,255. Patented Jan. 10, 1882.
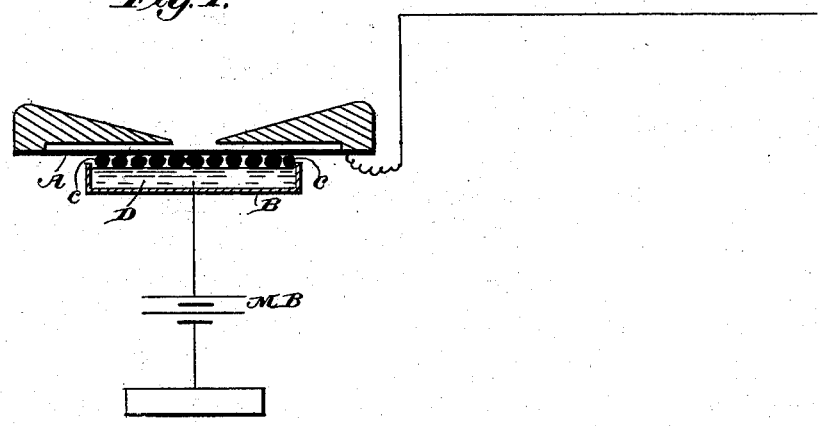
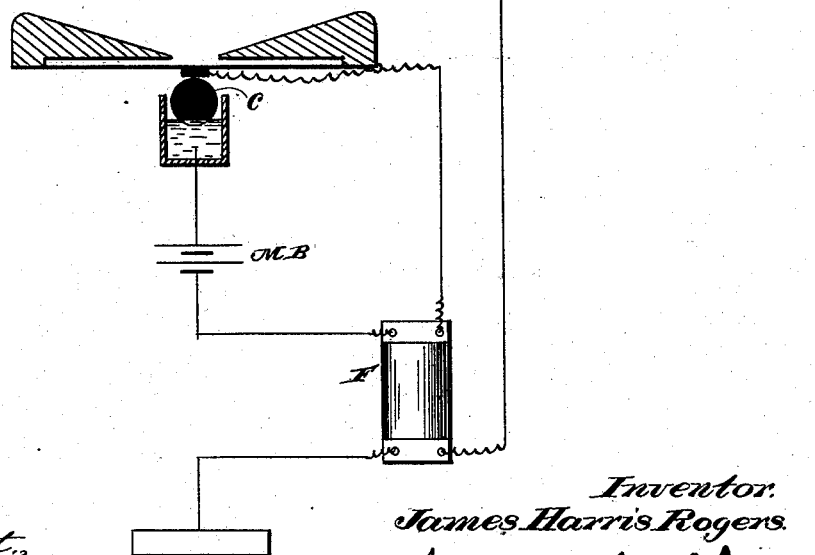
Witnesses.
Robert Everett.
J. A. Rutherford
Inventor.
James Harris Rogers.
By James L. Norris.
Atty.

UNITED STATES PATENT OFFICE.

JAMES H. ROGERS, OF WASHINGTON, DISTRICT OF COLUMBIA, ASSIGNOR OF ONE-HALF TO FRANK HUME AND L. G. HINE, BOTH OF SAME PLACE.

TELEPHONE.

SPECIFICATION forming part of Letters Patent No. 252,255, dated January 10, 1882.

Application filed December 9, 1881. (No model.)

*To all whom it may concern:*

Be it known that I, JAMES HARRIS ROGERS, a citizen of the United States, residing at Washington, in the District of Columbia, have invented new and useful Improvements in Telephones, of which the following is a specification.

My invention relates to that class of instruments known as "contact-telephones," in which the strength of the current is varied by changes of resistance caused by the vibrations of the transmitting-diaphragm.

The object of the invention is to produce an instrument which will be very sensitive to the vibrations of the diaphragm, and which utilizes to the greatest extent the power of the battery.

To this end my invention consists in the use of a stationary cup of mercury placed in close proximity to the diaphragm, and on the surface of which float one or more balls, fragments, or broken pieces of carbon, the diaphragm being preferably of carbon and directly in contact with the floating carbon; or a carbon button on the diaphragm may rest in contact with the floating carbon. As just remarked, the diaphragm in my improved instrument is preferably formed of a plate of carbon, although it may be made of any suitable material. When the word "carbon" is used I wish to be understood as including any electro-conductor in which carbon is a constituent.

In the accompanying drawings, Figure 1 is a diagram view of the preferred form of instrument, and Fig. 2 a similar view of another form of instrument.

Referring now especially to Fig. 1, A is the diaphragm, which in this instance is preferably made of carbon, although any suitable conducting or semi-conducting material ordinarily used for such purpose may be employed. A cup, B, is arranged in close proximity to the diaphragm, and is filled or partly filled with mercury D. Upon the mercury I place one or more balls, fragments, or broken pieces of carbon, c, or carbon-dust may be used. This material of course floats upon the surface of the mercury, and the diaphragm is arranged so as to be in direct contact with it. Any ordinary and suitable means of moving the mercury-cup toward or from the diaphragm to adjust the instrument for use may be employed. The current flows from battery M B to mercury and through the carbon to line, as shown. An induction-coil may be employed with the usual good effect in instruments of this class. The vibrations of the diaphragm caused by a sound uttered in its vicinity cause variations of contact between the floating carbon and diaphragm and between the carbon and mercury, which variations cause corresponding changes or undulations of the current on the line, as is well understood.

I have found that the instrument above described is exceedingly sensitive to sound-vibrations, and that it utilizes a great amount of the battery power, thus causing undulations of large amplitude on the line.

In Fig. 2 I have shown but one carbon ball c floating on the mercury, and, instead of placing the diaphragm directly in contact with the ball, a carbon button in contact with which the ball rests is secured centrally upon the diaphragm. In this figure I have shown the instrument and battery M B placed in the primary wire of an induction-coil, F, the secondary of which goes to ground and line, as is well understood. The operation is similar to that of the instrument shown in Fig. 1.

In my improved transmitter the carbon balls or fragments may be of any suitable size and number. I have spoken specially of carbon because it is the best material now known for use in instruments of this class; but of course any other material possessing similar characteristics may be employed.

I am aware that heretofore it has been proposed to float a pencil of carbon in a bottle, some distance from the diaphragm, containing mercury, in contact with a carbon button on the diaphragm. Such an arrangement is objectionable for the reason that the pencil requires guides and supports to retain it in a vertical position, and there is more or less friction between the pencil and guides, and this impairs the delicacy and sensitiveness of the instrument, and may produce foreign sounds in the receiver. I do not desire to cover any such arrangement in the following claims, but wish distinctly to limit myself to the mercury-cup placed in close proximity to the diaphragm, and to balls, fragments, or dust of carbon floating freely on the surface of the mercury.

Having thus described my invention, what I claim as my invention is—

1. The combination of the diaphragm, the mercury-cup in close proximity to the diaphragm, the mercury, and the free floating carbon in contact with the diaphragm, substantially as set forth.

2. The combination of the diaphragm, the mercury-cup in close proximity thereto, mercury, and the carbon balls or fragments floating on the mercury and in contact with the diaphragm, substantially as set forth.

3. The combination of the carbon diaphragm, the mercury cup in close proximity thereto, the mercury, and the free floating carbon balls or fragments, substantially as set forth.

In testimony whereof I have hereunto set my hand in the presence of two subscribing witnesses.

JAMES HARRIS ROGERS.

Witnesses:
   JAMES L. NORRIS,
   JAMES A. RUTHERFORD.